United States Patent [19]

Hargreaves

[11] Patent Number: 4,648,080
[45] Date of Patent: Mar. 3, 1987

[54] METHOD FOR DETERMINING THE FAR FIELD SIGNATURE OF A MARINE SEISMIC SOURCE FROM NEAR-FIELD MEASUREMENTS

[75] Inventor: Neil D. Hargreaves, Isleworth, England

[73] Assignee: Western Geophysical Company, Houston, Tex.

[21] Appl. No.: 620,886

[22] Filed: Jun. 15, 1984

[51] Int. Cl.$^4$ ............................................. G01V 1/38
[52] U.S. Cl. ....................................... 367/20; 367/15; 181/110; 181/118
[58] Field of Search ..................................... 367/20-23, 367/15, 144; 181/110, 118

[56] References Cited

U.S. PATENT DOCUMENTS 4,146,870  3/1979  Ruehle .................................. 367/20
4,476,553  10/1984  Ziolkowski et al. ................. 367/144

OTHER PUBLICATIONS

Ziolkowski et al., The Signature of an Air Gun Array: Computation from Near-Field Measurements Including Interactions, Oct. 1982, pp. 1413–1421.
Berkhout, Seismic Migration Imaging of Acoustic Energy by Wave Field Extrapolation, 1980, pp. 125–126.

Primary Examiner—Thomas H. Tarcza
Assistant Examiner—Daniel T. Pihulic
Attorney, Agent, or Firm—William A. Knox

[57] ABSTRACT

A method for obtaining far-field signatures of marine source arrays by the downward continuation of near-field data recorded along a short signature streamer of closely spaced hydrophones, located beneath the array. This method has several advantages over conventional far-field signature measurement techniques. The technique can be used in water depths as shallow as 50 meters, it does not require any precise knowledge of the array geometry or of the location of the recording sensors, and it may be used on a shot-by-shot basis to obtain signatures for use in a shot-by-shot signature deconvolution.

7 Claims, 6 Drawing Figures

METHOD FOR DETERMINING THE FAR FIELD SIGNATURE OF A MARINE SEISMIC SOURCE FROM NEAR-FIELD MEASUREMENTS

BACKGROUND OF THE INVENTION

1. Field of the Invention

This invention is concerned with deriving the far-field signature of a marine seismic acoustic source, such as a multi-element air-gun array, from near-field measurements.

2. Description of the Prior Art

As is well known, in the process of marine seismic exploration, a ship-towed submerged acoustic source is periodically triggered to generate an acoustic wavefield. The resulting wavefront propagates downwardly into the earth beneath the water, is reflected from sub-bottom earth layers, and returns to the water surface. Near, but below the water surface, arrays of hydrophones, towed by the same or another ship, detect the reflected pressure waves, convert the detected pressure waves to electrical signals and transmit those signals to a signal utilization device.

When the acoustic source is triggered, as is well known, it produces a complex output pressure pulse in the water. Converted to an electrical signal, the output pulse of, for example an air gun, consists of a short wavetrain whose envelope displays an initial fast rise time followed by several rapidly-decaying oscillations. The envelope of the wavetrain might be, for example, about 100 milliseconds (ms) long and is termed the "signature" of the source.

The acoustic wave generated by the source radiates spherically such that there is a vertically downgoing direct component as well as an upwardly-travelling component. The water-air interface is an excellent reflecting surface. The upward-travelling component of the acoustic wave is reflected and is reversed in polarity by the water surface to become another vertically downgoing component generally referred to as a ghost.

Marine acoustic sources are usually deployed a few meters beneath the water surface. Assuming a depth of 6 meters and a water velocity of 1500 meters per second (mps), the two-way lag time between the direct wave and the ghost is 8 ms. Accordingly, the ghost interferes, with opposite polarity, with the direct wave to further complicate the source signature which circumstance we shall refer to as the ghost effect. As one goes farther away, the ghost assumes increasing importance. At certain temporal frequencies, the ghost will virtually cancel the direct wave. That frequency is referred to as the ghost notch frequency. Whether we like it or not, the ghost is usually an integral part of the source signature for most all practical purposes.

If the acoustic source can be considered to be a point source, such as a small explosive charge or a single air gun, the source signature without its ghost is independent of distance and direction. In practice, a typical acoustic source consists, not of a single element, but of a spatially-distributed array of elements that generate direct arrivals plus the ghost components. That is particularly true of air guns, which are currently fashionable in marine exploration. The spatial dimensions of an array of source elements may be comparable to the wavelengths of the acoustic waves themselves within the useful seismic-frequency pass-band. Therefore, as is well known, the source signature of an array in the near field becomes a function of both distance and direction.

The source signature of an array becomes independent of distance (except for attenuation due to spherical spreading) only in the far field. It is the far-field signature that is needed for data processing.

The far field may be firstly defined as that distance between a source array and a receiver at which the travel time difference due to travelpath angularity between the extremities of the array and the receiver become insignificantly different from that which would be observed if the receiver were at infinity. For practical purposes, insignificant means a few (2-5) milliseconds. By this criterion, the far field distance, for a typical array dimension of 30 or 40 meters, is on the order of 200 meters.

A further criterion defining the far field is related to the ghost component of the source signature. Because of spherical spreading, the relative amplitude of the direct and the ghost component varies with distance from the source array. Again, the far field signature is that distance at which the source signature becomes independent of distance, which for this criterion is that distance at which the ratio of the direct and ghost amplitudes becomes close to that which it would be at infinity. In practice a 95% development of the ghost component with respect to the direct component would be acceptable. For an array depth of 6 meters, that criterion would give a far field distance of about 250 meters.

The main objective of the above discussion is to emphasize that typically, the far field distance for a marine source array is on the order of 200 to 300 meters. A direct measurement of the far field must therefore be made at that, or greater, distances from the array.

We now address ourselves to the problem of measuring the far-field signature of a multi-element acoustic source array such as an array of air guns.

Most marine seismic exploration projects are conducted over the continental shelf at water depths in the range of less than 25 up to about 200 meters. Thus, a direct measurement of the far field signature is impossible during the course of a normal exploration project.

As previously mentioned, a source signature may have a duration of about 100 ms. In shallow water, say 50 meters deep, an acoustic source array might be towed at 6 meters with a single receiver towed at a depth of 15 meters. The acoustic pulse from a central point of the array will arrive at the receiver in 6 ms, followed 8 ms later by the ghost. The composite pulse will then be reflected upwardly from the ocean floor and arrive at the receiver 51 ms after the gun is triggered. Therefore the ocean bottom reflection will contaminate the last half of the acoustic wave-pulse envelope in the far field. Hence, it is clear that an attempt to directly measure the far-field signature of a source array in shallow water presents problems.

One obvious, time-honored method for measuring the far-field signature of an acoustic array is of course to move into deep water in excess of 200-300 meters. However there are certain problems: Often, deep water may lie many, many miles from the exploration project. The cost of interrupting the seismic survey to make special separate experiments is usually unjustifiable. For another reason, at sea it is nearly impossible to determine the precise relative positions of source and receiver without extremely expensive and elaborate positioning equipment. Hence, far-field measurement of the source array signature in deep water may not be useful.

A method for far-field signature measurement from near-field data in shallow water has been proposed by Ziolkowski, Parkes, Hutton, and Haugland, *Geophysics*, October, 1982, pp. 1413-1421. In that method, the acoustic pressure signature near each gun of an air gun array is measured in the presence of the pressure signatures of all of the guns. By suitable processing the far-field signature is derived from the near-field measurements. In the above method, with an array of n guns, the problem is solved iteratively from n separate measurements. In their method, like the deep-water method, Ziolkowski, et al. require precise measurements of the separation between source and receivers as well as a precise measurement of the spacing between elements of the array. As before stated, it is very difficult to accurately measure the position of anything that is towed around in the sea.

It is an object of my invention to determine the far-field signature of a multi-element marine acoustic source array, during the course of a normal data-acquisition program, in relatively shallow water (e.g. 50 meters or less), without precise knowledge of the source-receiver geometry.

SUMMARY OF THE INVENTION

In accordance with a preferred aspect of my invention, I deploy a marine acoustic source array in a body of water. The array includes a plurality of source elements. Beneath the source array I deploy a signature streamer that includes a plurality of sensor elements that are spaced apart by a distance less than half the length of the shortest wavelength of interest. The length of the signature streamer is greater than the length of the source array by a distance such that the signal-amplitude contributions by the sensors at the extremities of the array are insignificant relative to a summation of all of the sensor signals. The signature streamer depth is chosen, such that a lateral offset of the signature streamer relative to an element of the source array will not substantially alter the sensor signal envelopes in terms of phase shift and amplitude due to the ghost effect from that would be observed if the source element were directly above the signature streamer. The source array is triggered to generate an acoustic wave that is detected by the sensors. The detected signals are recorded and later processed by wavefield extrapolation to yield the desired far-field signature.

In the processing, the recorded signals are summed and an extrapolation filter is applied to the summed signals to obtain the vertical far field signature. Alternatively, a time-shifted version of each recorded signal is summed and the extrapolation filter is applied to the sum to obtain the far field signature at an angle away from the vertical.

In another aspect of this invention the summation step may be applied either before or after recording the sensor signals.

In a still further aspect of this invention the geometry of the source array and signature streamer are imperfectly known.

BRIEF DESCRIPTION OF THE DRAWINGS

A better understanding of the benefits and advantages of my invention may be obtained from the appended detailed description and the drawings, wherein.

DETAILED DESCRIPTION OF THE PREFERRED EMBODIMENT

Figure 1:
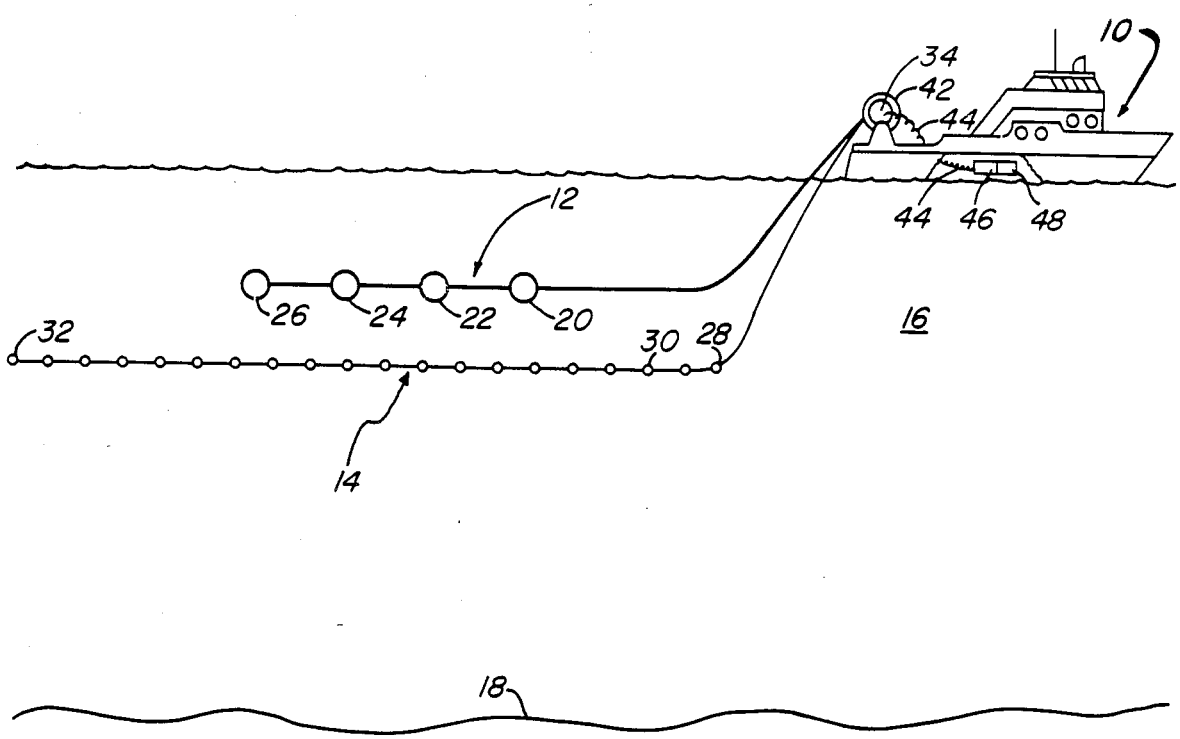
FIG. 1 is a side view of the essential equipment used to practice the method for this invention.

The arrangement of equipment used to practice the method of this invention is shown in FIG. 1. A ship 10 tows a source array 12 and a signature streamer 14 through a body of water 16 above water bottom 18.

Figure 2:
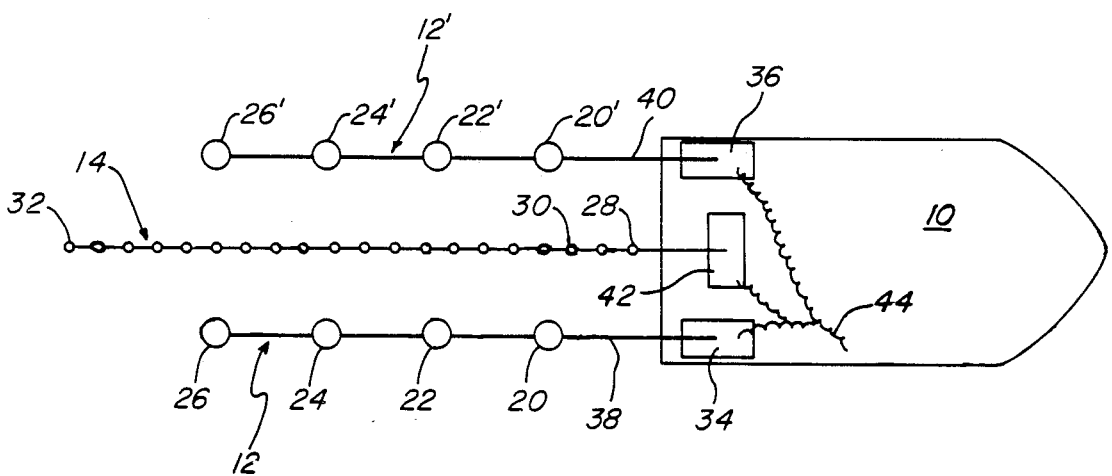
FIG. 2 is a plan view of FIG. 1.

Source array 12 consists of a plurality of seismic acoustic sources such as 20, 22, 24, 26 which may be air guns, of which four are shown by way of example but not by way of limitation. A single source array is shown in FIG. 1, but several such arrays such as 12, 12' may be used, laterally displaced from one another, as shown in FIG. 2, in a manner well known to the art. The spacing longitudinally and laterally, between the respective sources, their acoustic output power and their firing sequence are chosen to optimize desired characteristics of the source signature and to optimize the direction of the acoustic beam with respect to dipping sub-bottom earth layers as is also well known. But the actual dimensional geometry of the source arrays and the signature streamer may be otherwise imperfectly known.

Signature streamer 14 includes an array including a number of sensors such as hydrophones 28, 30, 32 mounted in an oil-filled jacket. There may be as many as 100 hydrophones included in the jacket. The spacing between hydrophones is not more than half the length of the shortest seismic wavelength of interest. For example, if the upper temporal frequency limit is 250 Hz, the hydrophone spacing would be no more than 3 meters. The signature streamer is longer than the acoustic source array. The length is such that the signal amplitude contributions by the sensors, such as hydrophones 28 and 32, positioned at the extremities of the signature streamer 14 are less than a small percentage of the summation of all signals from all of the hydrophones in the signature streamer. A typical percentage might be 5%. The purpose of that restriction in length is to provide a margin of safety so that a longitudinal or lateral shift in the relative positions of source array and signature streamer will not create a significant difference in the value of the total summation of the hydrophone signals. As pointed out earlier, it is not possible to precisely pinpoint the relative positions of objects being towed through the sea.

Signature streamer 14 is disposed beneath source array 12 at a depth such that the change in the hydrophone-sensor signal envelopes, due to the shift in lateral offset of the signature streamer relative to the respective source arrays in terms of phase shift and amplitude due to the ghost effect discussed supra, is small and insignificant.

Figure 3:
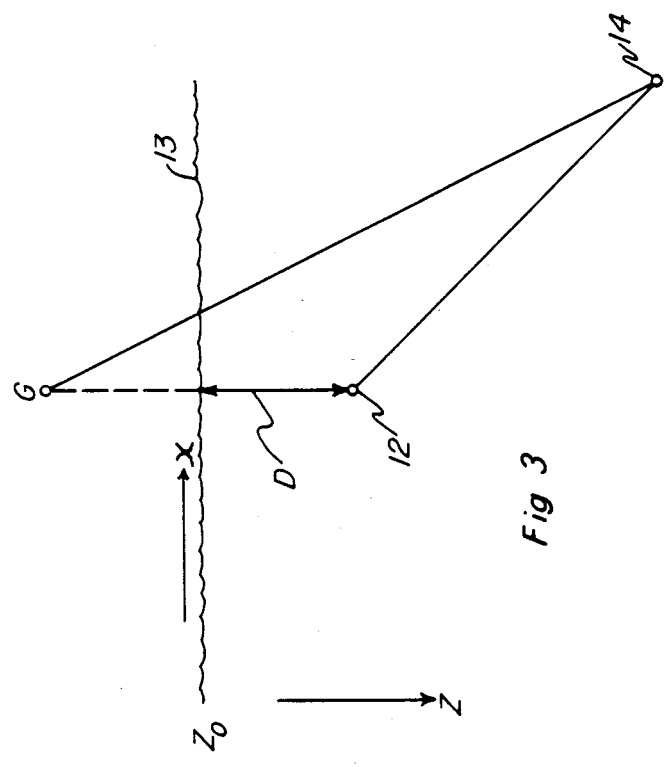
FIG. 3 shows the effects of a ghost reflection.

Quantitatively, the above statement is more easily understood by reference to FIG. 3. Given a source array 12 at a depth D of 6 meters, a signature streamer 14 at a depth of 15 meters and a water velocity V, of 1500 mps as before, the image of the ghost lies at G or 2D above the source. The signature streamer is displaced laterally about 10 meters to the right. The travel time difference between a direct signal received at 14 and the signal due to the ghost is the difference in the travel time of the path lengths 12–14 and G–14, which difference should approximately be equal to the vertical travel time difference over a path of length 2D within less than 2 ms. Path G–14 is about 23.3 meters, path 12–14 is about 13.5 meters giving a path-length difference of about 9.8 meters or 6.5 ms in terms of time. Since 2D is 12 meters or 8 ms, travel time, the temporal phase shift is about 1.5 ms which is small and within limits.

Referring to FIGS. 1 and 2, the source arrays 12 and 12' may be towed by means of booms or davits 34, 36 near the stern of ship 10 at the end of lines 38 and 40 along with the usual air hoses and fire-pulse control lines. Signature streamer 14 may be towed by and stowed on a suitable cable reel 42. Fire control lines and sensor signal transmission lines 44 lead from a signal utilization device 46 to the respective towed units. The sensors in signature streamer 14 may be coupled in parallel to provide a summed sensor signal or the signals from each sensor may be transmitted over individual data channels to signal utilization device 46, FIG. 1. Signal utilization device 46 may include also an archival data storage device 48 such as a magnetic tape recorder, diskette modular memory, or other similar device.

It should be understood that signature studies may be conducted concurrently with a conventional marine seismic survey. In that case, the usual multisection marine streamer cable, not shown, would be towed behind ship 10 along with but separately from signature streamer 14. Source arrays 12, 12' would then generate not only source-signature data but also the usual seismic reflection data. Sensor signals from the signature streamer could be parallel-recorded on individual channels by signal utilization device 46 along with recording of normal seismic reflection data. As a further economy of equipment, signature streamer 14 could be integrated with a conventional multisection marine streamer cable, although that arrangement might be less desirable because the signature streamer could not be independently manipulated.

Figure 4:
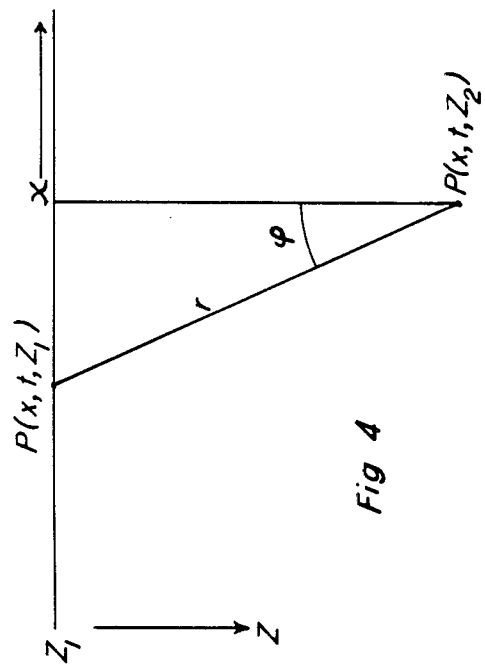
FIG. 4 illustrates the concepts of wavefield extrapolation.

Thus far, we have described the equipment that is to be used to obtain a near-field source signature. We have shown that an imperfect knowledge of the geometry of the source arrays and the streamer is not fatal, at least within reasonable limits that are readily attainable in the field. The data that are recorded represent a pressure signature P as a function of x, t, $Z_1$, where x is lateral offset, t is a travel time parameter and $Z_1$ is the depth of the streamer. What is desired is (FIG. 4)

$$P(x,t,Z_2)$$

where $Z_2$ is representative of the far field region and therefore $Z_2 >> Z_1$.

The downward extrapolation for a downgoing wavefield in two dimensions may be determined from the Kirchoff formulation for a pressure wavefield $$P(x,t,Z_2) = F * \int HP(x,t-r/V,Z_1)dx, \quad (1)$$

where $$H = \frac{\cos\phi}{(2\pi r)^{\frac{1}{2}}} \quad (2)$$

$$F = \omega^{\frac{1}{2}} \exp(i\pi/4) \quad (3)$$

and * indicates a convolution operation. See FIG. 4. Equation (1) is fully explained in *Seismic Migration, Imaging of Acoustic Energy by Wavefield Extrapolating,* A. J. Berkhout, Elsevier Scientific Publishing, 1980, pp. 109–137. Of course it would be possible to formulate the extrapolation for three-dimensional space, using measurements of the pressure wavefield over an area beneath the source array.

At a large distance from the signature streamer, (2) may be ignored so that the integral reduces to a summation of the near-field outputs of the respective sensors in the signature streamer. F is an extrapolation filter operator having the dimensions of amplitude and phase.

In the extrapolation operation, the signals as recorded may be summed with the extrapolation filter then being applied to the summed signals to obtain the vertical far-field signature. Alternatively in accordance with (1), the recorded signals may be time-shifted prior to summing and filtering to obtain the far-field signature at an angle away from the vertical. In actual fact, application of a time shift is the general solution to (1) with a zero time shift being equivalent to the special case of vertical extrapolation.

When the source array has width as in FIG. 2, the extrapolation function is unable to discriminate between time delays associated with lateral positioning of the elements of the array and those associated with the in-line position of the array elements. The extrapolation to the far field compensates only for those travel time effects in the near field data that are related to the in-line position of the array elements. The array width and the streamer depth must therefore be such that the differences in recorded travel times for the cross-line elements of the source array are small compared to the smallest period (reciprocal of the frequency) of interest as was previously explained.

Figure 5:
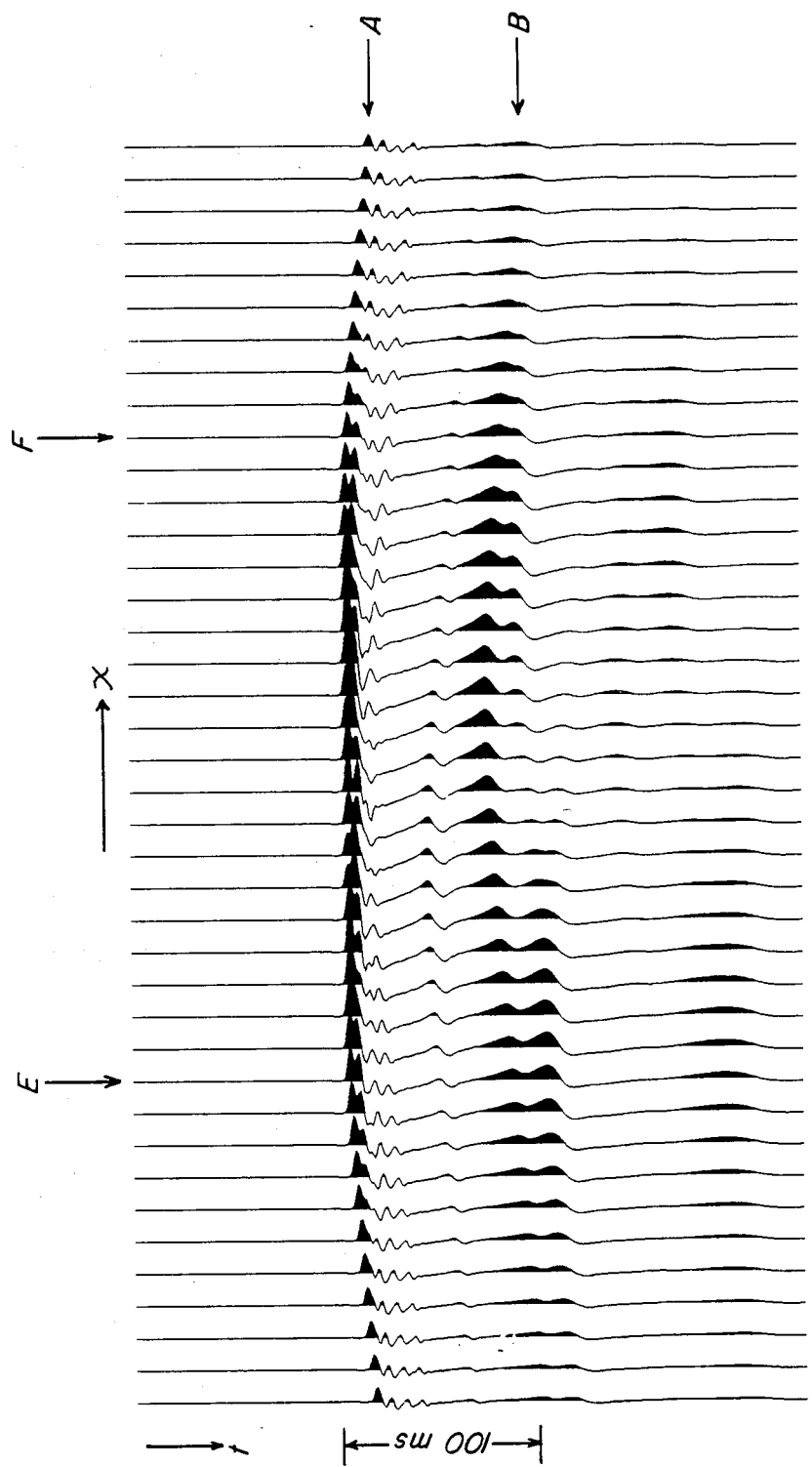
FIG. 5 is a set of synthetic recorded near-field signatures.

FIG. 5 illustrates signals received at each sensor of a 40-hydrophone signature streamer plotted as a function of time t and space x, by variable-area traces. The amplitude of each trace is a function of pressure. Events marked A are direct arrivals from a source array of four air guns that are approximately centered over the signature streamer. The ghost arrival is difficult to distinguish at the scale of this recording. The water bottom reflection is probably the event marked B. Because the signature streamer sensors are so much closer to the source array than to the water bottom, the B events are much weaker than the direct arrivals and will tend to cancel out after summation. As we would expect, the direct events seen by the sensors at the extremities of the signature cable that is, the events to the left of E and to the right of F, are weak and will not contribute substantially to a summation of all direct-event signals. The advantage here, is that the sensors may be shifted one way or the other in the longitudinal x direction without significantly altering the result. Precise longitudinal positioning is therefore not critical.

Figure 6:
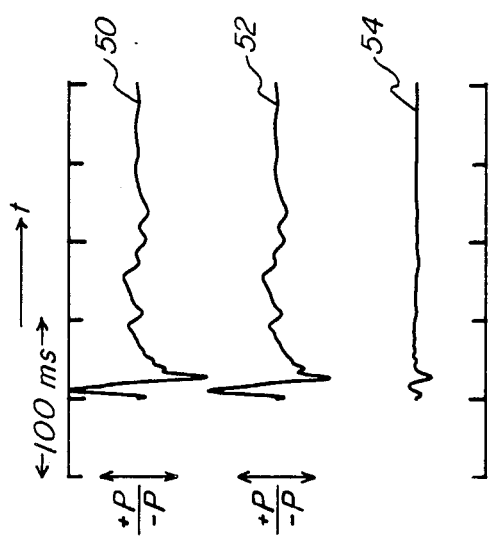
FIG. 6 shows the correspondence between an exact calculation of a far-field signature and the far-field signature obtained by wavefield extrapolation of the near field signature of FIG. 5.

The data presented in FIG. 5 are synthetic data. An exact solution for the far-field signature was computed in FIG. 6, first trace 50. FIG. 6 is plotted in terms of pressure P and time t. The near-field data from FIG. 5 were then summed and then the extrapolation filter according to (3) was applied to provide the extrapolated second trace 52 of FIG. 6. The third trace 54 in FIG. 6 is a plot of the difference between traces 50 and 52 and demonstrates the excellent degree of correspondence between the exact solution and that obtained from wavefield extrapolation.

In operation, the source array 12 is triggered to produce an acoustic wave which is detected by the sensors of the signature streamer 14. The signals are transmitted from the respective sensors to signal utilization device 46 where the signals may be recorded by archival storage medium 48. The respective signals may then be summed and are subsequently filtered by extrapolation filter F to define the required far-field signature. The sum-filtering process may be performed by signal utilization device 46 in real time or it may be performed later in a data-processing center, using the archivally-recorded data. The so derived far-field signature may be used for quality control to monitor source array operation in the field and it may also be used to create a deconvolution operator as is employed in conventional well-known seismic data processing.

The summation step may be performed either before or after the step of data recording. For example, the sensors in the signature streamer may be wired in parallel so that the streamer output is a summed signal to which the extrapolation filter may be applied directly.

As earlier stated, signature recording may be conducted concurrently with conventional seismic reflection data recording. That procedure has the advantage that the source array signature is always available in the face of changing physical conditions in the field. Thus the quality of the processing of the recorded reflection seismic data may be enhanced by use of real-time source-array signatures instead by use of some hypothetical signature as is often presently done in the absence of real field data.

For illustrative purposes, my invention has been described with a certain degree of specificity. Variations will occur to those skilled in the art but which may be included within the scope and spirit of this invention which is limited only by the appended claims.

I claim as my invention:

1. A method for deriving the far-field signature of a marine seismic source array from near-field measurements of acoustic signals, comprising the steps of:
   (a) deploying, in a body of water, a marine seismic source array that includes a plurality of source elements;
   (b) deploying, in said body of water, a signature streamer including a plurality of sensors, said sensors being spaced apart by less than one-half the length of the shortest wavelength of interest, the length of said signature streamer being greater than the length of said source array by an amount such that the signal amplitude contributions by the sensors positioned at the extremities of the signature streamer are less than a desired percentage of a summation of all signals from said sensors;
   (c) disposing said signature streamer beneath said source array at a desired depth such that the change in the sensor signal envelopes, due to lateral offset of the signature streamer relative to said source array, in terms of phase shift and amplitude due to a ghost effect is small;
   (d) triggering the elements of said source array to produce an acoustic wave;
   (e) recording the output signals from said sensors, due to said acoustic waves, on an archival storage medium;
   (f) processing said recorded signals by wavefield extrapolation to define a far-field source signature of said array; and
   (g) utilizing said far-field source signature for enhancing the quality of processed reflection seismic data.

2. The method as defined by claim 1, wherein the step of processing includes the steps of:
   summing said recorded output signals; and
   applying an extrapolation filter to said summed signals.

3. A method for deriving the far-field signature of a marine seismic source array from near-field measurements of acoustic signals, comprising the steps of:
   deploying a multi-element marine seismic source array in a body of water;
   deploying a signature streamer in said body of water, said signature streamer including a plurality of sensors that are spaced apart by less than one-half the length of the shortest wavelength of interest, the length of the signature streamer being greater than the length of the array by a desired amount;
   disposing said signature streamer beneath the source array at a depth such that the lateral offset of said signature streamer relative to any individual source array element will change the sensor-signal characteristics due to a ghost effect by a small amount;
   causing said source array to generate an acoustic wave;
   recording the sensor output signals due to said generated acoustic wave;
   defining a far-field source signature by summing said recorded signals and applying a wavefield extrapolation filter to the summed signals; and
   utilizing said so-defined far-field source signature to enhance processed reflection seismic data.

4. The method as defined by claim 3 including the further step of:
   conducting a reflection seismic survey concurrently with the derivation of the far-field signature of said source array.

5. The method of determining the far-field signature of a seismic source array in a body of water comprising:
   (a) detecting the near-field signature of the entire source array over an array of detectors deployed over an extent, one of whose dimensions is greater than the corresponding dimension of the source array and beneath the source array;
   (b) recording said near-field signature;
   (c) obtaining the far-field signature of the source array by wave-field extrapolation of the recorded near-field signature.

6. The method as defined by claim 3 wherein the dimensional geometry of said source array and said signature array are imperfectly known.

7. The method as defined by claim 1 comprising the step of:
   summing the output signals from said sensors, due to said acoustic waves, prior to the step of recording.

* * * * *